C. F. NAYER.
ANIMAL SCRAPING MACHINE.
APPLICATION FILED MAY 12, 1917.
1,329,724. Patented Feb. 3, 1920.
3 SHEETS—SHEET 3.
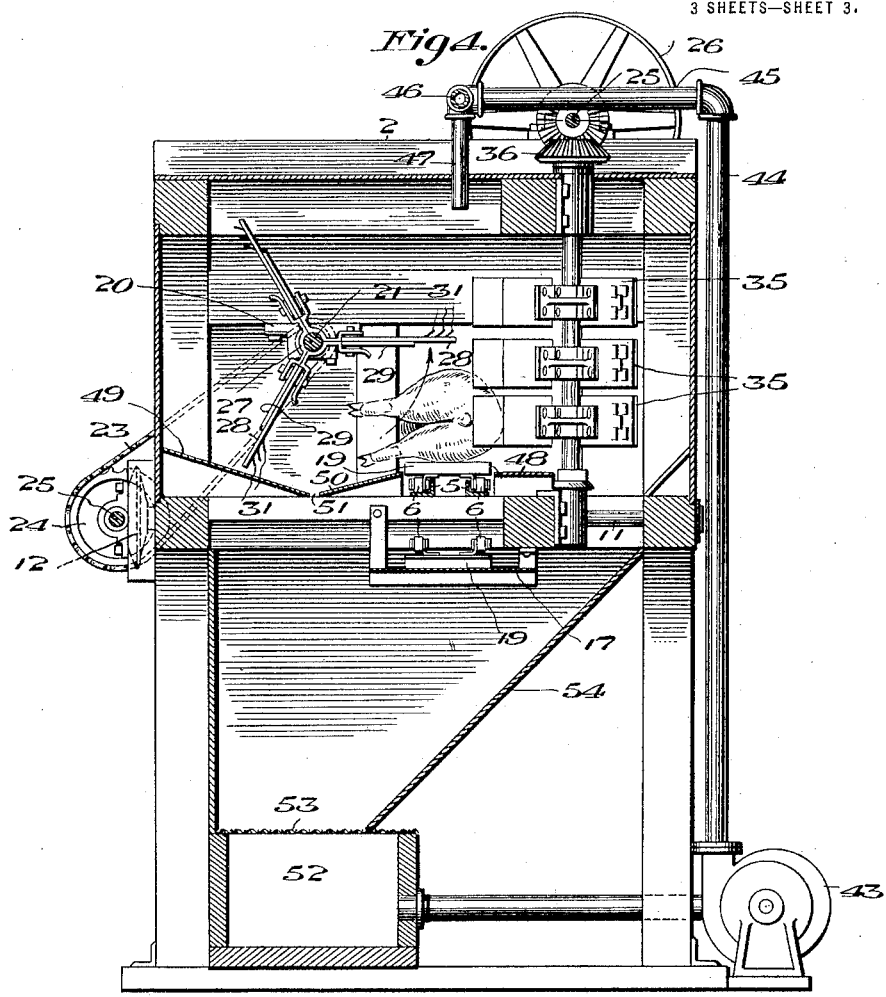
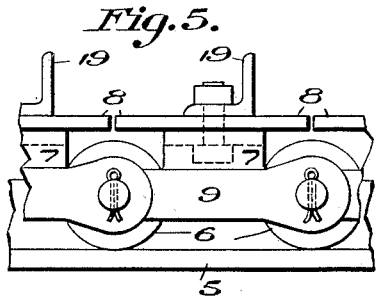
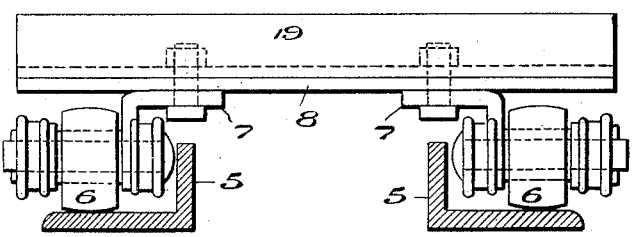
Witnesses
Philip E. Barnes
Inventor
Carl F. Nayer
By Edmund H. Parry.
Attorney

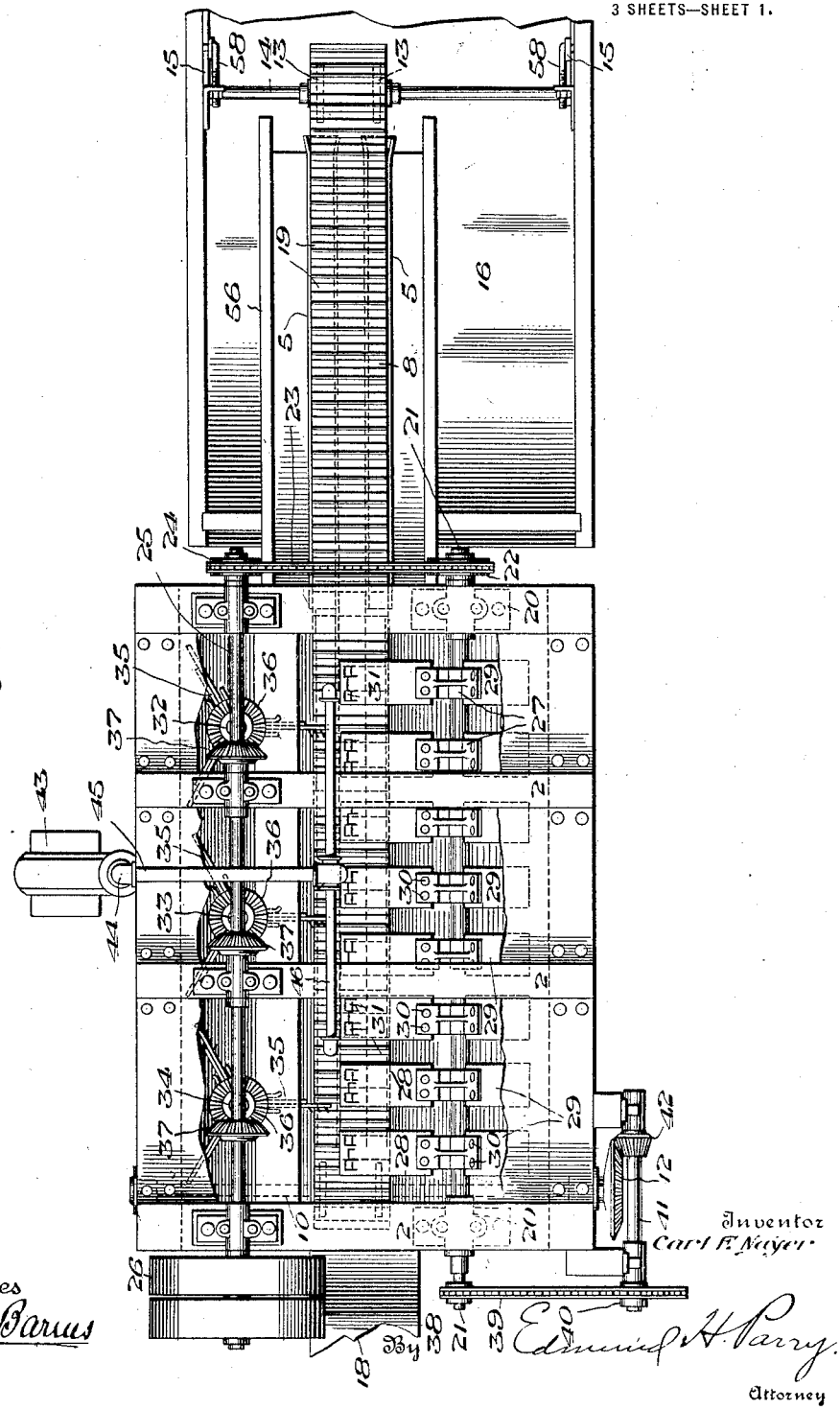

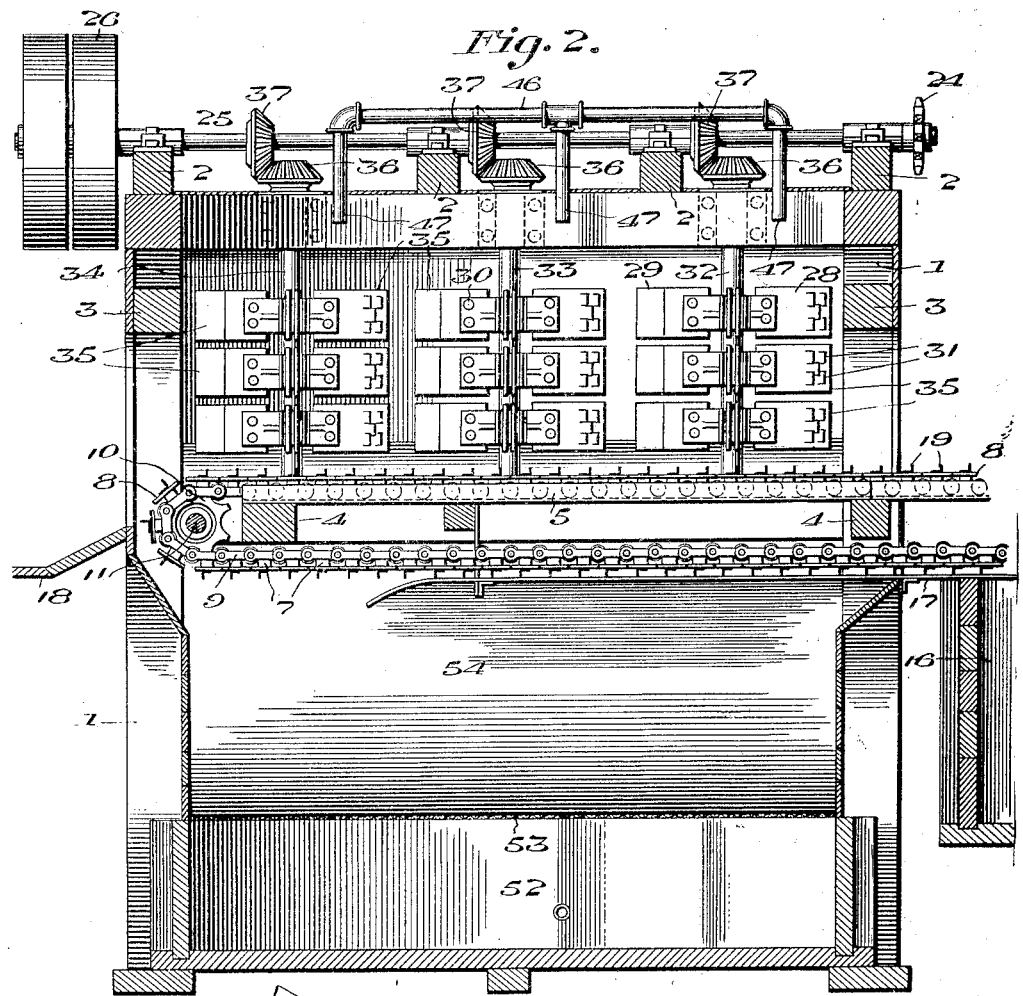
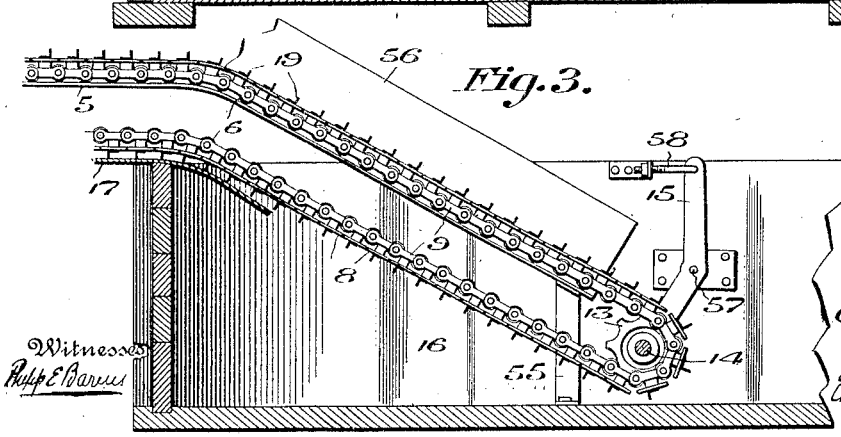

UNITED STATES PATENT OFFICE.

CARL F. NAYER, OF CHICAGO, ILLINOIS, ASSIGNOR TO THE PACKERS MACHINERY & EQUIPMENT CO., OF CHICAGO, ILLINOIS, A CORPORATION OF ILLINOIS.

ANIMAL-SCRAPING MACHINE.

1,329,724.  Specification of Letters Patent.  Patented Feb. 3, 1920.

Application filed May 12, 1917. Serial No. 168,234.

*To all whom it may concern:*

Be it known that I, CARL F. NAYER, a citizen of the United States, residing at Chicago, in the county of Cook and State of Illinois, have invented certain new and useful Improvements in Animal-Scraping Machines, of which the following is a specification, reference being had therein to the accompanying drawing.

This invention relates to animal scraping machines and has more specific reference to carcass dehairing and polishing machines.

One of the primary objects of the invention is to transport the carcass through the machine in a positive manner without the utilization of shackles or hooks to prevent two or more of the carcasses overlapping each other which would preclude proper action thereon by the juxtaposed beater elements.

Another object of the invention is to provide for advancing a plurality of carcasses through a dehairing machine, at whatever rate may be predetermined, in such manner that overlapping or piling-up of one carcass upon another is precluded and which would prevent proper action on each of the carcasses by the dehairing and polishing elements of the machine.

Still another object within the contemplation of my invention is to provide a machine in which there is a traveling instrumentality, the action of which is to advance a plurality of carcasses through the machine in a positive manner without the utilization of shackles or hooks and in spaced-apart relation so that an operator can be assured that any required number of carcasses can be passed through a machine within a given time without danger of piling-up of one carcass upon another and also so that the dehairing elements of the machine may, thus, effect their proper function on each carcass throughout the entire surface of the carcass.

A further object of the invention is to provide a machine in which the carcasses are conveyed therethrough in a positive manner and in a predetermined spaced-apart relation, in juxtaposition to a plurality of sets of beater elements, one set being arranged to rotate on an axis angularly disposed to the axis of another set, and wherein likelihood of undesirable displacement of the carcass out of range of proper action thereon by the beater elements, is obviated.

A further object of the invention is to provide in a hog-dehairing and polishing machine a plurality of sets of beater elements, the rotating action of one set operating to counteract any tendency of another set to undesirably displace the carcass out of proper range of the various sets of the beater elements.

With these and other important objects in view, the invention resides in a novel combination of instrumentalities, and in the particular and related aggroupment thereof, all as hereinafter more fully set forth.

In order that the invention may be more readily comprehended, I have disclosed a preferred embodiment of the same in the accompanying drawings, it being understood that these drawings are merely illustrative and that the invention is susceptible of various other embodiments and utilizations without departing from the spirit of the invention.

In these drawings:

Figure 1 is a view in top plan (with parts broken away) of a hog-dehairing machine constructed in accordance with my invention;

Fig. 2 is a view in vertical longitudinal section thereof;

Fig. 3 is a fragmentary view in vertical longitudinal section of a portion of the machine;

Fig. 4 is a view in vertical transverse section;

Fig. 5 is a fragmentary view in elevation, on a larger scale, of a portion of the carcass-conveyer; and Fig. 6 is a fragmentary view in vertical transverse section thereof.

Referring to the drawings, it will be observed that they include a

*Supporting structure.*—This structure comprises an upright frame 1 and cross-pieces 2, 3 and 4. On the upper face of the cross-pieces 4 are flanged tracks or ways 5 adapted to be traversed by rollers 6 journaled in brackets 7 that are carried by cross-pieces or slats 8. Between the rollers 6 are connecting links 9. These various elements—the rollers 6, brackets 7, cross-pieces 8 and links 9—constitute an endless conveyer which, in this instance, is approximately a foot in width and is adapted to travel, as an entity, along the tracks 5 and around the wheels or sprockets 10—mounted on a shaft 11 at one end of the frame and which carries a gear 12 that receives motion in a manner presently to be explained—and, also, around a second set of wheels or sprockets 13 on a shaft 14 journaled in adjustable side brackets 15 disposed in a scalding receptacle or tub 16, the details of which will be more fully disclosed hereinafter, the conveyer being guided in its travel by an extended plate 17 secured to the lower face of the cross-pieces 4, this plate 17 being of less length than that of the tracks or ways 5 and being downwardly curved at its ends, as shown in Fig. 3. By means of this conveyer the carcasses are advanced in a positive manner from the scalding tub 16 through the machine and delivered onto the receiving platform 18 at the opposite end of the frame 1, it being understood that the carcasses are delivered onto the conveyer in a spaced-apart relation. In order to secure proper action of the elements, presently to be described, of the machine while the carcasses are passing therethrough, it has been found desirable not only initially to dispose the carcasses onto the conveyer as they pass from the scalding tub but, also, to maintain them in this spaced-apart relation. Any desirable means for maintaining this spacing relation and which would not injure the carcass may be employed but, in practice, I have found it advantageous to utilize that which is herein described and which comprises a series of angular animal-engaging instrumentalities 19 secured to and upstanding from the cross-pieces 8 of the conveyer.

Preferably and as shown, the tracks 5 are disposed in an approximately horizontal plane so that the carcasses are advanced through the machine in a substantially similar plane.

While thus being advanced, it is desirable to treat them by instrumentalities which I shall now describe:

*Beaters.*—Journaled in brackets 20 depending from the cross-pieces 3 is a horizontal shaft 21 carrying at one end a sprocket-wheel 22 which receives motion by a chain 23 that, in turn, receives motion from a sprocket-wheel 24 carried by a shaft 25, this shaft carrying at its opposite end driving-pulleys 26 adapted to be driven in any preferred or required manner. Mounted on the shaft 21 is a series of beaters. Any desired or preferred type of beaters may be employed; but I prefer to utilize the type herein disclosed, though these, specifically, are not of my invention, they being of the invention of Robert E. Jordan and constitute the subject-matter of his pending application, Serial No. 152,423. Generally speaking, these beaters include a mounting 27 fast on the shaft 21 and in which are loosely disposed beater-elements 28 and a reinforcing element 29, both of these elements being slidable on a bolt 30 carried by the mounting 27. The beater-elements 28 carry at their outer ends scrapers or dehairing devices 31.

Preferably and as shown, the beater-elements 28 rotate on an axis disposed in parallelism with the direction of travel of the conveyer and, thus, in this instance, turn on an axis which is substantially horizontal and extends longitudinally of the machine. As thus disposed, and as the beater-elements 28 are of a predetermined length, their ends are adapted to project into a plane which overlies the adjacent edge of the conveyer. They thus project over the conveyer while they are in their most active position to operate upon the carcass. The action of these beater-elements is two-fold, in that they operate to effect a turning or rolling of the carcass upon the conveyer and at the same time effect their designed scraping and dehairing action.

While, in general, these beater-elements would suffice for the purpose; yet I have found it advantageous to augment them by a second series of beater-elements disposed to rotate on an axis arranged at an angle and preferably at substantially right angles to that of the beater-elements 28. This second series of beaters includes a structure which comprises vertically disposed shafts 32, 33 and 34—there being, in this instance, three of these, though there may be a larger number if desired—and on each shaft is mounted one, two or three beaters, designated, generally, by the reference-character 35 and which are of a construction similar to those mounted on the shaft 21. These beaters 35, by being disposed on the shaft 32, rotate on an axis which is at an angle to that of the shaft 21 and, thus, at an angle to the direction of travel of the conveyer. The shafts 32, 33 and 34 are journaled in the cross-pieces 2 and 4, and at its upper end each shaft carries a gear 36 adapted to mesh with a gear 37 on the shaft 25.

It will now be understood that when the shaft 25 is driven, the shafts 32, 33 and 34 will be rotated by gears 37 thereon, so that such shafts will be given rotation and effect rotative movement of the vertically disposed beaters. At the same time, the shaft 21, through the sprocket-wheels 22 and 24 and the chain 23 will be driven to effect a rotative movement of the horizontally disposed beaters. On the end of the shaft 21 is mounted a sprocket-wheel 38 which is adapted to drive a sprocket 39 to operate a sprocket-wheel 40 mounted on a short shaft 41 and which carries a pinion 42 adapted to mesh with the gear 12 on the shaft 11 and by which means the conveyer is given its traveling movement from left to right, as viewed in Fig. 1, for instance. It will, therefore, be seen that the rotation of the horizontally disposed beaters and of the vertically disposed beaters, and the traveling movement of the conveyer or apron are coordinated, preferably, so that, as each carcass is advanced through the machine, one or more of the horizontally disposed beaters will act on the carcass transversely of its body, while one or more of the vertically disposed beaters will act on the carcass-body longitudinally thereof. The horizontally disposed beater-elements function not only to effect a scraping and cleaning action on the carcass but, also, by reason of the fact that they rotate in a counter-clockwise direction, as viewed in Fig. 3, for instance, each carcass is rolled in a clockwise direction, toward the vertically disposed beaters. The arrangement of these vertically disposed beaters is such as to tend to operate upon at least two ends of the carcass and thereby tend to maintain the carcass on the conveyer in proper longitudinal position. Any tendency of the horizontally disposed beater-elements to retard the progress of the carcasses through the machine is counteracted by the vertically disposed beater-elements operating in the same general direction of movement as that of the conveyer. In general practice, where it has been proposed to convey carcasses to a machine in a sort of spaced-apart relation, the carcasses are maintained by shackling them or by employing a hook fast on a conveyer. It is an important desideratum of my invention to transport the carcasses through the machine without the utilization of shackles or hooks and yet, at the same time, to maintain them on the conveyer in the same spaced-apart relation to which they are fed thereonto by the operator. This contemplates the coöperation of the different sets of beaters and the particular relation specified of the beaters to the conveyers and the general direction of rotation of the beaters in respect thereto. In practice, where the feeding of the carcasses through the machine has been attempted without the use of shackles or hooks, it has been found that where horizontally disposed beaters operate upon the carcass, the beaters retard the travel of the carcass and thereby cause it to slip backward on the conveyer; whereas, in my improved machine, the vertically disposed beater-shafts are arranged in a position so that the rotation of the beaters thereon will tend to progress the carcass through the machine in the same direction as that of the travel of the conveyer. Thus, the carcasses having been positioned on this conveyer in proper spaced-apart relation as the conveyer passes out of the scalding tub, the members 8 function to maintain the carcasses in this prearranged spaced-apart relation. Having reached the end of the machine opposite to the scalding tub, they are delivered onto the platform 18 all dehaired and polished.

To facilitate the cleaning operation to which the carcass is subjected during its passage through the machine, it is desirable to project a stream of water on the carcass and, to this end, I provide a pump 43 which is in operative connection with a vertical pipe 44 with which communicates a short horizontal pipe 45 to supply a horizontally disposed supply-pipe 46 from which depends short pipes or nozzles 47, these being preferably disposed above and in vertical alinement with the conveyer.

Mounted to the right of the conveyer—as viewed in Fig. 4—is a longitudinally extending plate 48; while at the opposite side of the conveyer are two downwardly inclined plates 49 and 50 spaced-apart to provide an opening 51, onto which plates the hairs, dirt, etc., as the same are removed from the carcass, are washed by the water and then, through the opening 51, delivered into an underlying receptacle 52 provided with a hair-screen 53. To guide the matter falling from the plates 49 and 50 into the receptacle 52, an inclined guide-piece 54 is provided.

The scalding tub 16 is preferably of sufficient dimensions to hold a number of carcasses. As already explained, the conveyer-tracks 5 extend down into the scalding tub, the tub-ends of the tracks being supported on uprights 55, and on these are also mounted an upstanding carcass-guide 56 by means of which each carcass is guided, in a lengthwise direction, onto the conveyer preparatory to being advanced through the machine.

To tighten the conveyer-chains, in event that they become unduly stretched out, the brackets 15 are pivoted at 57 and are adjusted on such pivots by means of the adjusting screws 58.

The travel of the carcasses through the machine is quite rapid, the capacity of the machine for treating these carcasses depending only upon the length of the same and the speed of the conveyer. As each carcass is advanced through the machine, it is rolled over and over by the rotative action of the horizontally disposed beaters. Then, both sets of beaters—the horizontally and vertically disposed beaters—serve to scrape the hair therefrom, various surfaces and parts of the carcass being presented to these different beaters as the carcass progresses through the machine. By reason of the fact that the beater-elements of the beaters are flexible, they yield and conform more or less to the contour of the body of the carcass but, by reason of their inherent resiliency, they swing back to normal position quickly and constantly. The beating action of these beaters, coöperating with the scalding water from the aforementioned nozzles, loosens the hair and bristles and then easily removes the same from the carcass without injury to the hide thereof, so that, when the carcass is discharged from the machine, it is absolutely clean and all hair and bristles removed therefrom.

From the foregoing, it will be perceived that I have devised a structure which is simple and compact and one which embodies comparatively few parts; and yet one which is effective to treat, in a thorough manner, a large number of carcasses per hour. The provision of a constantly moving conveyer upon which the carcasses are maintained at all times while passing through the machine in a spaced-apart relation insures the rapid and successful progressing of each carcass through the machine without danger of one carcass overlapping or being piled upon a preceding carcass. In consequence, the two sets of beaters are permitted to perform their designed function upon each carcass separately and completely to dehair and clean the same. So far as I am aware, it is novel with me to progress a plurality of carcasses in a constantly maintained spaced-apart relation through a dehairing machine on conveying means arranged to travel in a path in juxtaposition to beaters and without the use of shackles or hooks; and I also believe it new with me to provide a plurality of sets of beaters operating in planes and on axes angularly disposed with relation to each other whereby such beaters are permitted to act upon the carcass both longitudinally and laterally of its body, one set of the beaters operating to effect a rolling movement of the carcass on the conveyer while under action of such beaters and while under the action, also, of the other set of beaters.

What I claim is:

1. A hog-dehairing machine including in combination, a supporting structure, a plurality of series of beater elements disposed within the same, and an endless carcass-conveyer traveling in juxtaposition to the beater elements and in a plane approximately parallel to the axes of one series of beater elements, whereby said elements effect a rolling of the supported carcass in a direction approximately at right angles to that of the travel of the conveyer, and at an angle to the axes of another series of the beater elements.

2. A hog-dehairing and polishing machine including in combination, a supporting structure, a series of beater elements disposed within the same, and an endless carcass-conveyer traveling in juxtaposition to the beater elements and in a plane right angularly disposed with reference to the axes of some of the beater elements, such axes being approximately parallel to the direction of travel of the conveyer to cause the elements to function to roll the supported carcass over and over on the conveyer in a direction transverse to the direction of travel of the conveyer.

3. A hog-dehairing and polishing machine including a supporting structure, a carcass-conveyer constantly traveling therethrough in a substantially horizontal plane and at a predetermined speed, a series of beater elements rotatable in a substantially horizontal plane and in parallelism to the conveyer and adapted to roll a carcass on the conveyer, and a second series of beater elements rotatable on an axis at approximately right angles to the direction at which the animal is rolled.

4. A hog-dehairing and polishing machine including in combination, a support, a series of beater elements mounted on the support to rotate on a substantially horizontal axis, a carcass-conveyer traveling in parallelism with the axis of the beater elements, and a second series of beater elements mounted to rotate on an axis at a substantial angle to that of the first series; the first-mentioned series of elements effecting a rolling of the carcass on the conveyer in a direction transverse to the direction of travel of the conveyer and toward the second-mentioned series.

5. A hog-dehairing and polishing machine including in combination, a supporting structure, a horizontal shaft journaled therein, a series of beater elements on the shaft, a plurality of sets of beater elements rotatable on an axis disposed at an angle to that of the shaft, and a carcass-conveyer traveling in parallelism to the shaft and in juxtaposition to both series of beater elements; the axes of the elements extending parallel to the direction of travel of the elements whereby said elements effect a rolling of the carcass on the conveyer in a direction transverse to its normal direction of travel and simultaneously therewith a dehairing action on the carcass.

6. A hog-dehairing and polishing machine including a supporting structure, a carcass-conveyer traveling therethrough and onto which animal-carcasses may be disposed in spaced-apart relation, means carried by the conveyer for maintaining the carcasses in such spaced-apart relation during their travel through the machine, beater elements juxtaposed to the conveyer and adapted to have a dehairing action on the carcasses thereon, and means carried by the beater elements for effecting a rolling and dehairing action of the carcasses on the conveyer while being maintained in their spaced-apart relation; the axes of some of the elements extending in a direction parallel to the direction of normal travel of the conveyer whereby, in addition to their dehairing action such elements function to roll the carcass on the conveyer in a direction approximately transverse to such direction of travel of the conveyer.

7. A hog-dehairing and polishing machine including a supporting structure, a scalding receptacle adjacent one end thereof, a constantly moving conveyer adapted to travel upwardly from the scalding receptacle and then horizontally to adjacent the opposite end of the supporting structure for conveying a plurality of carcasses through the machine in spaced-apart relation, flexibly mounted beater elements juxtaposed to the conveyer and adapted to operate on the carcasses while passing through the supporting structure on the horizontal section of the conveyer, and means for maintaining the carcasses on the conveyer in spaced-apart relation; the axes of some of the elements extending in a direction parallel to the direction of normal travel of the conveyer whereby, in addition to their dehairing action such elements function to roll the carcass on the conveyer in a direction approximately transverse to such direction of travel of the conveyer.

8. A hog-dehairing and polishing machine including in combination, a supporting structure, a carcass-conveyer traveling from adjacent one end of the supporting structure to adjacent the other end thereof for passing a plurality of carcasses therethrough in spaced-apart relation, a plurality of sets of flexibly mounted beater elements juxtaposed to the conveyer, the axes of one set being at right angles to the axis of the other set, and means for maintaining the carcasses on the conveyer in spaced-apart relation; the conveyer and the beater elements being coördinated to effect a dehairing action upon substantially the entire surface of the carcasses without effecting undesirable overlapping and piling of one carcass upon another and with proper dehairing action upon each carcass as it passes through the machine.

9. A hog-dehairing and polishing machine including a supporting structure, a carcass-conveyer traveling through the structure for transporting hog-carcasses therethrough, a series of beater elements mounted to rotate on an axis substantially parallel to the direction of travel of the conveyer, a plurality of shafts each rotating on an axis disposed at an angle to the direction of travel of the conveyer, and a plurality of beater elements disposed on each of said shafts.

10. A dehairing and polishing machine including a supporting structure, a carcass-conveyer mounted to travel therethrough and transport carcasses in spaced-apart relation through the structure, a beater-supporting shaft arranged in substantial parallelism with the direction of travel of the conveyer, a series of beater elements mounted on the shaft and having their outer ends adapted to move in a plane which overlies the conveyer, a series of beater-supporting shafts disposed at an angle to the first-mentioned shaft, and a plurality of beater elements mounted on each of said shafts and adapted to swing into a plane that also overlies the conveyer.

11. A dehairing and polishing machine including a supporting structure, a carcass-conveyer mounted to travel therethrough and transport carcasses in spaced-apart relation through the structure, a beater-supporting shaft arranged in substantial parallelism with the direction of travel of the conveyer, a series of beater elements mounted on the shaft and having their outer ends adapted to move in a plane which overlies the conveyer, a series of beater-supporting shafts disposed at an angle to the first-mentioned shaft, a plurality of beater elements mounted on each of said shafts and adapted to swing into a plane that also overlies the conveyer, and a scalding receptacle at one end of the supporting structure and into which said conveyer passes.

12. A carcass-dehairing machine including a conveyer for advancing a carcass from one end of the machine to the other, and a plurality of yieldable beater elements simultaneously acting on the carcass upwardly and other beaters acting in the direction of advancing movement of the carcass.

13. A hog dehairing and polishing machine including in combination, a supporting structure, a hog conveyer traveling in a substantially horizontal plane for continuously advancing a plurality of carcasses in spaced-apart relation through the structure and comprising upstanding members for maintaining the carcasses in spaced-apart relation during their travel through the structure, and beater elements rotatable during the travel of the carcasses on the conveyer through the machine and operative to dehair each carcass separately while it is being advanced, the axes of some of the elements extending in a direction parallel to the normal direction of travel of the conveyer whereby such elements effect a rolling of the carcass in a direction transverse to such direction of travel of the conveyer.

14. A carcass dehairing machine including in combination, a supporting structure, a carcass conveyer traveling longitudinally through the structure in a substantially horizontal plane, means on the conveyer for continuously advancing carcasses and maintaining said carcasses thereon in spaced-apart relation, and beater elements rotating on an axis in substantial parallelism with the direction of travel of the conveyer, said elements projecting beyond one edge of the conveyer and functioning to roll the carcass on the conveyer and also to scrape the same.

15. A carcass dehairing machine including in combination, a supporting structure, a carcass conveyer traveling longitudinally through the structure, means on the conveyer for continuously advancing carcasses and maintaining said carcasses in spaced-apart relation, beater elements rotating on an axis in substantial parallelism with the direction of travel of the conveyer, said elements projecting beyond one edge of the conveyer and functioning to roll the carcass on the conveyer and also to scrape the same, and a second series of beater elements disposed to rotate on axes arranged at an agle to the direction of travel of the conveyer and projecting beyond the opposite edge of the conveyer and functioning to scrape the carcass.

16. A hog dehairing machine including a supporting structure, a carcass conveyer for continuously advancing a plurality of carcasses through the machine in spaced-apart relation, a plurality of sets of beater elements juxtaposed to the conveyer and one set rotating on an axis at an angle to that of another set, the beater elements of both sets projecting beyond the opposite edges of the conveyer, one set of beater elements functioning to scrape each carcass in a longitudinal direction while another set functions to scrape each carcass in a substantial transverse direction.

17. A dehairing machine having a conveyer adapted to loosely carry a carcass, in combination with two sets of dehairing elements for operating upon said carcass, rotatable supports for said dehairing elements rotating upon non-parallel axes whereby one set tends to accelerate the velocity of the carcass, and one set tends to retard the velocity of the carcass whereby said carcass moves through the machine at substantially the velocity of said conveyer.

18. A dehairing machine having a conveyer adapted to loosely carry a carcass, in combination with two sets of dehairing elements movable substantially at right angles for operating upon said carcass, rotatable supports for said dehairing elements rotating upon non-parallel axes whereby one set tends to accelerate the velocity of the carcass, and one set tends to retard the velocity of the carcass whereby said carcass moves through the machine at substantially the velocity of said conveyer.

19. A dehairing machine having a belt conveyer adapted to loosely carry a carcass, in combination with movable dehairing elements operable upon axes parallel to the direction of travel of said conveyer whereby the elements tend to roll the supported carcass in a direction substantially at right angles to the travel of the conveyer, and additional dehairing elements operable in partial opposition to said first aforesaid dehairing elements to assist in advancing the carcass through the machine.

20. A dehairing machine having a conveyer movable in a substantially horizontal plane and adapted to loosely carry a carcass, in combination with independently mounted dehairing elements rotatable upon an axis in substantial parallelism with the conveyer plane for operating upon one side of said carcass and tending in their operation to roll said carcass upon said conveyer, and a second set of dehairing elements on the opposite side of the carcass rotatable on axes at an angle to the plane of the conveyer.

21. A dehairing machine having a conveyer adapted to carry a carcass, in combination with independently and yieldably mounted dehairing elements at one side of the conveyer for operating upon said carcass and tending in their operation to roll said carcass upon said conveyer, and additional independently mounted dehairing elements at the other side of the conveyer for operating upon said carcass and tending to move said carcass in the direction of movement of said conveyer, said conveyer traveling substantially horizontally past the dehairing elements and having means for maintaining a spaced relationship between succeeding carcasses.

22. A dehairing machine having a belt conveyer adapted to loosely carry a carcass, in combination with movable yieldably mounted dehairing elements for operating upon opposite sides of said carcass and adapted in their operations to maintain said carcass upon said conveyer.

In testimony whereof I affix my signature in presence of two witnesses.

CARL F. NAYER.

Witnesses:
WILLIAM GUGGENHEIM,
LOUIS HEYN.